(12) United States Patent
Mahieu

(10) Patent No.: US 9,919,960 B2
(45) Date of Patent: Mar. 20, 2018

(54) ANTISOLAR GLAZING

(71) Applicant: AGC Glass Europe, Louvain-la-Neuve (BE)

(72) Inventor: Stijn Mahieu, Lovendegem (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 100 days.

(21) Appl. No.: 14/768,058

(22) PCT Filed: Feb. 14, 2014

(86) PCT No.: PCT/EP2014/052945
§ 371 (c)(1),
(2) Date: Aug. 14, 2015

(87) PCT Pub. No.: WO2014/125083
PCT Pub. Date: Aug. 21, 2014

(65) Prior Publication Data
US 2016/0023942 A1   Jan. 28, 2016

(30) Foreign Application Priority Data

Feb. 14, 2013 (BE) .................................. 2013/0100
Mar. 14, 2013 (BE) .................................. 2013/0168
Jun. 27, 2013 (EP) .................................. 13173991
Jun. 27, 2013 (EP) .................................. 13173992

(51) Int. Cl.
B32B 15/04      (2006.01)
B32B 17/06      (2006.01)
C03C 17/36      (2006.01)

(52) U.S. Cl.
CPC .......... C03C 17/366 (2013.01); C03C 17/36 (2013.01); C03C 17/3626 (2013.01); C03C 17/3639 (2013.01); C03C 17/3644 (2013.01); C03C 17/3649 (2013.01); C03C 17/3681 (2013.01)

(58) Field of Classification Search
USPC ................ 428/426, 428, 432, 433, 434, 688
See application file for complete search history.

(56) References Cited

U.S. PATENT DOCUMENTS

| | | | | |
|---|---|---|---|---|
| 5,821,001 A * | 10/1998 | Arbab | ...................... | C03C 17/36 428/623 |
| 6,398,925 B1 * | 6/2002 | Arbab | ...................... | C03C 17/36 204/192.15 |
| 7,329,433 B2 * | 2/2008 | O'Shaughnessy | .. | C03C 17/2453 427/162 |
| 2004/0166328 A1 | 8/2004 | Stachowiak | | |
| 2005/0123772 A1 * | 6/2005 | Coustet | ................... | C03C 17/36 428/432 |
| 2005/0196622 A1 * | 9/2005 | Laird | ...................... | C03C 17/36 428/432 |
| 2007/0281171 A1 * | 12/2007 | Coster | ............... | B32B 17/10036 428/432 |
| 2008/0008876 A1 | 1/2008 | Laird et al. | | |
| 2008/0070044 A1 * | 3/2008 | Blacker | .............. | C03C 17/3626 428/426 |
| 2009/0324934 A1 | 12/2009 | Blacker et al. | | |
| 2010/0136365 A1 * | 6/2010 | Unquera | ................. | C03C 17/36 428/623 |
| 2011/0261442 A1 * | 10/2011 | Knoll | ...................... | C03C 17/36 359/360 |
| 2011/0262726 A1 | 10/2011 | Knoll et al. | | |
| 2012/0094111 A1 | 4/2012 | Laird | | |
| 2014/0071524 A1 * | 3/2014 | Disteldorf | ........... | C03C 17/3441 359/360 |

FOREIGN PATENT DOCUMENTS

| | | |
|---|---|---|
| WO | WO2002-048065 | 6/2002 |
| WO | WO2007-101963 | 9/2007 |
| WO | WO2010-072973 | 7/2010 |

OTHER PUBLICATIONS

U.S. Appl. No. 14/776,159, filed Sep. 14, 2015, Mahieu, et al.
U.S. Appl. No. 14/768,068, filed Aug. 14, 2015, Mahieu, et al.
International Search Report dated May 6, 2014 in PCT/EP2014/052945 Filed Feb. 14, 2014.
Third Party Observation (EP2956422), Nov. 4, 2016 (with machine translation).
Chinese Office Action issued in Application No. 201480008834.5 dated Oct. 18, 2017. (This Chinese Application corresponds to WO 20140239349 which corresponds to US2014/0071524 in the Office Action dated May 2, 2017).

* cited by examiner

*Primary Examiner* — Lauren R Colgan
(74) *Attorney, Agent, or Firm* — Oblon, McClelland, Maier & Neustadt, L.L.P.

(57) ABSTRACT

The invention relates to solar-control transparent glazing comprising, on a glass substrate, a transparent multilayer stack including an alternation of n silver-based functional layers and n+1 dielectric coatings, where n≥1, such that each functional layer is surrounded by dielectric coatings, and at least one solar-radiation-absorbing layer enclosed between two dielectric layers formed by a material selected from among aluminum or silicon nitrides or mixtures thereof, inside one of the dielectric coatings. At least one functional layer is disposed on top of the so-called absorbent layer, and an intermediate transparent oxide layer selected from among oxides of zinc, tin, zirconium, titanium or alloys of same and a zinc oxide-based wetting layer are disposed between the absorbent layer and the functional layer, the intermediate transparent oxide layer having a different composition from that of the wetting layer, said wetting layer being immediately next to the functional layer.

21 Claims, No Drawings

ANTISOLAR GLAZING

1. FIELD OF THE INVENTION

The field of the invention is that of solar-control glazings consisting of a glass substrate bearing a multilayer stack, of which at least one thin functional layer that reflects infrared radiation gives solar-control properties. This functional layer is combined with dielectric layers whose role is especially to regulate the reflection, transmission and tint properties and the protection against mechanical or chemical impairment of the properties of the stack. The stack also includes a solar radiation absorbing layer whose role is to increase the solar-control properties imparted by the functional layer that reflects infrared radiation. Furthermore, regulation of the thickness of this solar radiation absorbing layer makes it possible to adjust the light absorption and the light transmission.

More precisely, the invention relates to glazings intended to be fitted in buildings, but also in motor vehicles. Depending on their uses, certain required properties may differ.

Solar-control glazings have a plurality of functionalities. They especially concern the prevention of overheating in the passenger compartment of a motor vehicle, in particular with respect to solar radiation passing through a transparent sunroof, or with respect to a building exposed to solar radiation when this solar radiation is sufficiently intense. According to certain embodiments, this prevention of overheating may be obtained while maintaining appropriate light transmission.

In the case especially of glazings for buildings, but also for motor vehicles, they are increasingly required to be capable of withstanding heat treatments without their optical properties, in particular their light transmission and their color, especially in reflection, being substantially modified. The object is to be able to place side by side heat-treated glazings and others that have not been, without color differences appearing. The advantage is reflected especially in the production costs, since only one product needs to be produced instead of having to produce two different products.

In the rest of the description, the optical properties are defined for glazings whose substrate is made of ordinary clear "float" glass 4 mm thick. The choice of the substrate obviously has an influence on these properties. For ordinary clear glass, the light transmission through 4 mm, in the absence of a layer, is approximately 90% with 8% reflection, measured with a source conforming to the D65 "daylight" illuminant normalized by the CIE and at a solid angle of 2°. The energy measurements are taken according to standard EN 410.

The term "glass" is understood to denote an inorganic glass. This means a glass with a thickness at least greater than or equal to 0.5 mm and less than or equal to 20.0 mm, preferentially at least greater than or equal to 1.5 mm and less than or equal to 10.0 mm, comprising silicon as one of the essential constituents of the vitreous material. For certain applications, the thickness may be, for example, 1.5 or 1.6 mm, or 2 or 2.1 mm. For other applications, it will be, for example, about 4 or 6 mm. Clear, extra-clear or bulk-colored silico-sodio-calcic glasses are preferred.

The presence of a multilayer stack may pose color problems. The market usually demands that glazings offer, both in transmission and in reflection, a coloring that is as neutral as possible and thus of relatively gray appearance. Slightly green or blueish colorings are also possible. However, markedly more pronounced tints, for example blue or green, are also occasionally requested to satisfy particular esthetic criteria. The multilayer stacks, and in particular the nature, indices and thicknesses of the dielectric layers surrounding the functional layers, are chosen especially to control these colorings.

Motor vehicle glazings may in theory be multiple to give the glazings better insulating properties, especially heat insulation, as is generally the case for the glazings of buildings. Generally, however, motor vehicle glazings bearing a multilayer stack of the type of the invention are laminated, the multilayer stack being arranged inside the laminate.

The layer systems according to the invention must also lend themselves to the forming of glazings. Those used in vehicles are especially the subject of heat treatments during forming, especially the bending of glass sheets, or during toughening intended especially to give the glass sheets reinforced mechanical properties. Certain building glazings must also often undergo a toughening heat treatment to give them reinforced mechanical properties, especially to withstand heat shocks due to the temperature differences between sunlit zones and zones in shade of the same glazing installed in the facade of a building exposed to sunlight. The layers used according to the invention must withstand these treatments without their properties being degraded and without their esthetic appearance being modified. Treatments of this type demand temperatures which exceed 600° C. for about 10 minutes. The layers must conserve their qualities and properties when subjected to these temperatures.

The esthetic appearance is also of great commercial importance for solar protection glazings. Specifically, not only it is necessary for the glazing to have antisolar thermal properties, it must also participate toward the esthetic quality of the assembly of which it forms a part. These esthetic criteria may occasionally give rise to somewhat conflicting situations as regards obtaining the desired best thermal properties.

2. SOLUTIONS OF THE PRIOR ART

The prior art proposes antisolar glazings comprising at least one functional layer that reflects infrared radiation and a solar radiation absorbing layer surrounded by dielectric layers.

Patent application WO 2005/091864 A2 describes a multilayer stack comprising two silver-based functional layers and a solar radiation absorbing layer, in the form of NiCr, which makes it possible to adjust the light transmission of the coated glazing. According to certain examples, the NiCr absorbing layer is enclosed between two layers of silicon nitride and this assembly is arranged between the substrate and the first layer of silver, under which is arranged a wetting layer made of ZnO. In certain embodiments, the stack may undergo a toughening heat treatment.

Patent application WO 2009/032032 A1 describes the same structure consisting of solar radiation absorbing NiCr metal enclosed between two layers of silicon nitride, but this time arranged between the two functional layers of silver to solve a tint problem when the glazing is observed at oblique incidence. Certain examples have undergone a toughening heat treatment with a relatively low (≤3) variation in tint (ΔE*) in substrate-side (exterior) reflection. A wetting layer made of ZnO is also arranged under the functional layers of silver.

Patent application WO 02/48065 A1 describes in certain examples a solar radiation absorbing layer formed from a nitride, such as TiN, enclosed between two layers of silicon nitride, the assembly being arranged between the two functional layers of silver. A wetting layer made of ZnO is also arranged under the layers of silver. Certain examples may undergo a toughening heat treatment with relatively low optical modifications.

After high-temperature heat treatment, especially to perform thermal toughening, the solar control glazings according to these prior proposals have haze with unesthetic marks, which is esthetically unacceptable as regards obtaining a high-quality optical glazing according to the commercial demand.

3. OBJECTS OF THE INVENTION

An object of the invention is especially to overcome this drawback of the prior art.

More specifically, an object of the invention is to provide a glazing equipped with a multilayer stack with antisolar properties which is capable of undergoing a high-temperature heat treatment without any deterioration of its optical quality.

An object of the invention is also to provide a glazing equipped with a multilayer stack with antisolar and esthetic properties which is capable of undergoing a high-temperature heat treatment, of toughening and/or bending type, preferably without significant modification of its tint, in particular in substrate-side reflection, of its total light and energy transmission and of its total light and energy reflection, on the substrate side and the stack side, such that a glazing that has not been heat-treated can be juxtaposed with its heat-treated version without an observer being able to detect a significant difference in the overall esthetic appearance. Preferably, the modification of the optical and energy properties is less than 6%, advantageously less than 4% and ideally less than 2%.

An object of the invention is also, in at least one of its embodiments, to provide a glazing equipped with a multilayer stack which has good thermal, chemical and mechanical stability.

4. DESCRIPTION OF THE INVENTION

The invention relates to a transparent solar-control glazing comprising on at least one of the faces of a glass substrate a transparent multilayer stack comprising an alternation of n silver-based functional layers that reflect infrared radiation and of n+1 dielectric coatings, with n≥1, such that each functional layer is surrounded by dielectric coatings, and at least one solar radiation absorbing layer enclosed between two dielectric layers formed from a material chosen from silicon or aluminum nitrides, or mixtures thereof, inside one of the dielectric coatings, characterized in that at least one functional layer is placed on said solar radiation absorbing layer and in that a layer of intercalating transparent oxide chosen from zinc, tin, zirconium and titanium oxides or alloys thereof and a wetting layer based on zinc oxide, the intercalating transparent oxide layer being of a different composition from the wetting layer, are placed between this said solar radiation absorbing layer and this said functional layer, the wetting layer being in immediate proximity to this said functional layer.

The dielectric coatings, and in particular the intercalating transparent oxide layer, must be capable of undergoing the heat treatment imposed on the substrate coated with the multilayer stack without any significant deterioration or change in structure, and without any significant modification of the opto-energetic properties.

The wetting layer based on zinc oxide has a beneficial effect on the crystal growth of the silver-based functional layer that reflects the infrared radiation and also acts favorably on the recrystallization of this functional layer during the high-temperature heat treatment.

In the present description, the term "in immediate proximity" means that the silver-based functional layer and the wetting layer are in immediate vicinity to each other so that the wetting layer based on zinc oxide can have a favorable effect on the functional layer, especially during the deposition of the stack, but also during a high-temperature heat treatment, and especially a beneficial effect on the crystalline structure of the silver. This therefore does not exclude the presence of a very thin layer of another material interposed between the wetting layer and the functional layer, for example having a geometrical thickness of not more than 1 nm. Preferably, the wetting layer is in direct contact with this said functional layer.

For the purposes of the invention, the term "solar radiation absorbing layer" means a layer which absorbs part of the visible radiation, and which consists essentially of a material whose spectral extinction coefficient k(λ) is at least 0.2, preferably at least 0.3, at a wavelength of 500 nm.

The presence of a solar radiation absorbing layer makes it possible to filter out the heat energy which is in the visible part of the spectrum. By combining this filtering with the reflection of the infrared radiation, obtained by means of the functional layer, solar-control glazings can be obtained that are particularly effective for preventing the overheating of premises or passenger compartments subjected to strong sunlight. However, when the glazing must undergo a high-temperature heat treatment, especially for a mechanical reinforcement treatment by means of thermal toughening, the solar radiation absorbing layer cannot lose its absorption power, otherwise the solar control efficiency will decrease sharply and the optical properties of the glazing will also be modified.

The heat treatments, especially of bending/toughening type, may also induce more or less significant modifications in the optical properties and especially in the tints. Preferentially, these variations should be minimized such that, whether or not they are heat-treated, the glazings have a virtually unchanged appearance.

Conventionally, measurement of the colorimetric variations is performed from the coordinates of the CIELAB system. The colorimetric variation is expressed by the expression noted ΔE*, which expression corresponds to the formula:

$$\Delta E^* = (\Delta L^{*2} + \Delta a^{*2} + \Delta b^{*2})^{1/2}$$

in which ΔL* represents the difference between the colorimetric coordinates L* of the glazing before and after heat treatment, Δa* represents the difference between the colorimetric coordinates a* of the glazing before and after heat treatment, Δb* represents the difference between the colorimetric coordinates b* of the glazing before and after heat treatment.

More particularly, and preferably, the glazing according to the invention has a colorimetric variation in reflection on the glass substrate face, $\Delta E^*_{Rg}$:

$$\Delta E^*_{Rg} = (\Delta L^*_{Rg}{}^2 + \Delta a^*_{Rg}{}^2 + \Delta b^*_{Rg}{}^2)^{1/2}$$

of less than 8, preferentially less than 5, advantageously less than 3 and even preferentially less than 2, when said glazing is subjected to a temperature of at least 630° C. and of not more than 670° C. for 7 to 10 minutes.

Additionally, the glazing according to the invention also preferably has a colorimetric variation in transmission, $\Delta E^*_{TL}$:

$$\Delta E^*_{TL} = (\Delta L^*_{TL}{}^2 + \Delta a^*_{TL}{}^2 + \Delta b^*_{TL}{}^2)^{1/2}$$

of less than 8, preferentially less than 5, more preferentially less than 3, when said glazing is subjected to a temperature of at least 630° C. and of not more than 670° C. for 7 to 10 minutes.

The glazing according to the invention has, optionally in addition to the two preceding properties or otherwise, a colorimetric variation in reflection on the stack face side, $\Delta E^*_{Rc}$, such that:

$$\Delta E^*_{Rc} = (\Delta L_{Rc}{}^2 + \Delta a^*_{Rc}{}^2 + \Delta b^*_{Rc}{}^2)^{1/2}$$

of less than 8, preferentially less than 5, when said glazing is subjected to a temperature of at least 630° C. and of not more than 67° C. for 7 to 10 minutes.

Preferably, the light absorption, and thus the absorption of solar radiation in the visible part of the spectrum, due to the solar radiation absorbing layer, measured by depositing only this absorbing layer enclosed between its two dielectric layers on ordinary clear glass 4 mm thick, measured on the glass side, is between 5% and 45%, preferably between 10% and 35%.

To avoid modification of the optical properties of the stack and loss of the absorbing power of the solar radiation absorbing layer, this layer is inserted between two dielectric layers formed from a material chosen from silicon or aluminum nitrides and a mixture thereof. The minimum geometrical thickness of each of these dielectric layers is 8 nm.

It has been found, surprisingly, that the succession according to the invention "silicon or aluminum nitride or mixtures thereof/solar radiation absorbing layer/silicon or aluminum nitride or mixtures thereof/intercalating transparent oxide/wetting layer based on zinc oxide/silver-based functional layer that reflects infrared radiation" makes it possible to greatly reduce, or to prevent, the formation of haze with marks that is observed with the proposals of the prior art. The intercalating transparent oxide layer plays a fundamental role, but the reason for this beneficial effect is not yet fully understood. It has also been found that without this intercalating transparent oxide layer, the surface electrical resistance, and thus also the emissivity, have a tendency to increase undesirably following the heat treatment, whereas, by virtue of the presence of this intercalating oxide layer, the emissivity is at least conserved, or even beneficially reduced, following the heat treatment.

The addition of an oxide layer in proximity to the solar radiation absorbing layer is surprising since the risk of oxidation of the absorbing layer during the heat treatment is greatly increased and there is thus a significant risk of loss of the absorption properties and of modification of the optical properties during the treatment. It was found, surprisingly, that this is not the case and that, on the contrary, the optical quality is conserved after heat treatment. Moreover, on account of the solar radiation absorbing layer enclosed between two dielectric layers of nitride and of the wetting layer for the functional layer, the structure of the dielectric coating containing the solar radiation absorbing layer already comprises a succession of several different layers, which complicates the manufacturing process on an industrial device. The addition of an additional intercalating oxide layer, particularly into this coating, further increases this difficulty. We have discovered, surprisingly, that the beneficial effect arising therefrom on the optical quality after heat treatment of the coated glazing fully justified the management of this manufacturing difficulty.

The intercalating transparent oxide layer may be formed, for example, from $SnO_2$ or $TiO_2$. Preferably, the intercalating transparent oxide layer is based on an oxide chosen from mixed zinc tin oxide or mixed titanium zirconium oxide. These two oxides, and in particular mixed zinc tin oxide, as intercalating oxide layer, make it possible to obtain the best results as regards the removal of marks in the optical appearance after high-temperature heat treatment, and also as regards the conservation, or even reduction, of the electrical resistance and thus of the emissivity. The mixed zinc-tin oxide preferably comprises between 40% and 60% tin. The mixed titanium-zirconium oxide preferably comprises between 25% and 75% zirconium.

Preferably, the intercalating transparent oxide layer has a geometrical thickness of between 1 and 35 nm, advantageously between 3 and 25 nm and preferentially between 3 and 12 nm. This thickness makes it possible to obtain a favorable effect on the optical quality while at the same time preserving the other properties of the stack and readily accommodating the manufacturing constraints and the capabilities of the layer-depositing device. The appropriate thickness also depends on the position of the absorbing layer, which must be optimally adapted to the configuration. For example, when the absorbing layer is in the first dielectric coating, the thickness will be relatively low since the total thickness of the first dielectric coating is generally relatively thin. On the other hand, if the absorbing layer is in the second dielectric coating, its thickness may be slightly larger since the available space is greater. This intercalating transparent oxide layer may also be multiple, i.e. formed from two different oxides, for example mixed zinc-tin oxide followed by a very thin layer of mixed titanium-zirconium oxide.

Preferably, the dielectric layers enclosing the solar radiation absorbing layer are based on silicon nitride, and advantageously essentially consist of silicon nitride, i.e. to more than 90%, or even 95% and even 98% silicon nitride. The silicon nitride may conventionally be obtained from a target of silicon, optionally doped with aluminum or boron, by cathodic sputtering, using a magnetron, in a reactive atmosphere of nitrogen and argon. The silicon target is doped to give it the electrical conduction required for the cathodic sputtering, for example doped to at most 10% by weight with aluminum or boron, for example between 2% and 4%. The silicon nitride layers in the finished stack may be slightly oxidized on part of their thickness. These silicon nitride layers may also be richer in silicon than the theoretical stoichiometry. They have a minimum geometrical thickness of 8 nm.

According to a first embodiment, the solar radiation absorbing layer is essentially in metallic form. Although essentially in metallic form, the metal may have traces of nitridation due to the nitrogen-contaminated deposition atmosphere of the neighboring deposition zones. This may involve nitrogen leaks originating from the nitride deposition chambers which surround the absorbing layer, or the metal target may be placed in the same deposition chamber as the silicon target intended to form the silicon nitrides, given that the nitrogen will be predominantly attracted by the silicon. Many metals may be used, for instance palladium, niobium, tungsten, stainless steel, titanium, chromium, molybdenum, zirconium, nickel, tantalum or zinc, and alloys such as NiCr, NiCrW, WTa, WCr, NbZr, TaNiV, CrZr and NbCr, to mention but a few. Preferably, the solar radiation absorbing layer is a metal chosen from the alloys NiCr, NiCrW, WTa, WCr, NbZr, TaNiV, NbCr, CrZr and NiV, advantageously NiCrW and CrZr. It was found that these metal alloys were particularly suitable for use in the context of the invention for combining together the optical quality after heat treatment, the energy performance qualities and the chemical and mechanical durability of the stack.

The alloy NiCrW preferably comprises at least 30% by weight of tungsten, preferentially at least 35% and advantageously at least 37% or at least 40%. The proportion of nickel in this alloy is at least 9% by weight, preferably at least 20% by weight and advantageously at least 25% by weight, for example 30%, 35% or 40% by weight. In the NiCrW alloy, the proportion of Ni relative to Cr is preferably a proportion ranging from 90/10 to 50/50, advantageously about 80% Ni per 20% Cr. The proportion of NiCr relative to tungsten in the alloy NiCrW may vary greatly, but preferably ranges between 10% NiCr per 90% W and 65% NiCr per 35% tungsten, advantageously between 40% NiCr per 60% W and 63% NiCr per 37% W.

The CrZr alloy preferably comprises at least 25% by weight of chromium and at least 20% by weight of zirconium. Preferably, the layer comprises at least 35%, advantageously at least 40% and even at least 45% by weight of zirconium. Preferably, the alloy comprises between 20% and 75% by weight of zirconium, advantageously between 25% and 75% or between 30% and 75% by weight of zirconium, and favorably between 45% and 65% by weight of zirconium.

According to a second embodiment, the solar radiation absorbing layer is a nitride or a subnitride, i.e. a nitride with a sub-stoichiometric amount of nitrogen. Various absorbing nitrides may be used as long as, of course, they are not transparent. Mention may be made especially of zinc nitride, palladium nitride and stainless steel nitride, to mention but a few. However, they have drawbacks as regards the conservation of their opto-energetic properties during the high-temperature heat treatment. Preferably, the solar radiation absorbing layer is a nitride chosen from TiN, NiCrWN, NiVN, TaN, CrN, ZrN, CrZrN, TiAlN, TiZrN, WN, SiZrN and SiNiCrN, and advantageously chosen from TiN and NiCrWN. It was also found that these metal nitrides, and in particular TiN and NiCrWN, were particularly suitable for use in the context of the invention for combining together the optical quality after heat treatment, the energy performance qualities and the chemical and mechanical durability of the stack.

For the nitride NiCrWN, the preferred respective proportions of the various elements Ni, Cr and W are the same as indicated above for the metal alloy NiCrW, not taking the presence of nitrogen into account.

The stack may comprise a single silver-based functional layer. In this embodiment, the solar radiation absorbing layer is placed between the substrate and said functional layer, this layer being placed on a wetting layer based on zinc oxide. A glazing that affords efficient sun protection and that is relatively easy to manufacture may thus be obtained.

Preferably, the stack comprises at least two silver-based functional layers that reflect infrared radiation. This embodiment makes it possible to obtain a more selective glazing, i.e. a glazing with a low solar factor, which thus prevents the entry of heat, while at the same time conserving relatively high light transmission.

In particularly advantageous embodiments, the stack comprises three, or even four, silver-based functional layers. The selectivity of the glazings bearing these stacks is thus markedly improved.

When the stack comprises two silver-based functional layers, the solar radiation absorbing layer may be placed either between the substrate and the first functional layer, or between the two functional layers.

In a first embodiment, the solar radiation absorbing layer is between the substrate and the first functional layer. It should be noted here that, in the solar-control glazings of the type of the invention, the multilayer stack is placed in position 2, i.e. the coated substrate is on the outer side of the premises and solar radiation passes through the substrate and then the stack. This embodiment makes it possible to obtain efficient solar-control glazings, but it nevertheless has the drawback of absorbing heat radiation quite well and thus has a tendency to heat up. In the case of glazings with low light transmission, this heating may be such that it is necessary to perform a mechanical-reinforcement heat treatment for each glazing.

Preferably, according to a second embodiment, the solar radiation absorbing layer is between the two silver-based functional layers. In this second embodiment, part of the calorific solar radiation is reflected by the first silver layer and the energy absorption of the stack is lower than in the first embodiment. Furthermore, the interior light reflection is lower, which reduces the "mirror" effect inside the premises and improves the visibility through the glazing.

When the stack comprises three functional layers, the possibility of placing the solar radiation absorbing layer between the second and the third functional layers is added to the first two embodiments. This is likewise the case when the stack comprises four functional layers, but with an additional possibility.

Preferably, in all the embodiments, the energy absorption AE (according to standard EN410) of the glass substrate coated with the multilayer stack is less than 50%, preferably less than 45% and advantageously less than 40%. It is thus easier to avoid the obligation of toughening all the glazings of the same facade or of the same building, and to toughen only those which run the risk of being subjected to thermal constraints due to shadow zones.

In general, each dielectric coating may comprise a transparent dielectric layer usually used in the field, such as, to mention but a few, $TiO_2$, $SiO_2$, $Si_3N_4$, $SiO_xN_y$, $Al(O)N$, $Al_2O_3$, $SnO_2$, $ZnAlO_x$, $Zn_2SnO_4$, ITO, a mixed oxide of Ti and of Zr or of Nb, etc. The dielectric layers are generally deposited by magnetic field-assisted (magnetron) cathodic sputtering under reduced pressure, but they may also be deposited via the well-known technique known as PECVD (plasma-enhanced chemical vapor deposition).

In particular, the first dielectric layer deposited on and in contact with the glass substrate may be a nitride, such as silicon or aluminum nitride. Preferably, the first dielectric layer in contact with the glass substrate is a layer consisting of an oxide, and advantageously a layer of oxide of at least one element chosen from Zn, Sn, Ti and Zr, and alloys thereof. It was found that this in particular improves the chemical durability of the product that has not been heat-treated. Use may be made, for example, of a layer of titanium oxide, which is especially appreciated for its high refractive index.

Preferably, the first dielectric layer of the first dielectric coating, deposited on the glass substrate and in contact therewith, is a layer of mixed zinc-tin oxide, advantageously containing at least 20% tin, even more preferentially a layer of mixed zinc-tin oxide in which the zinc-tin proportion is close to 50-50% by weight ($Zn_2SnO_4$). This arrangement is advantageous for the resistance to high-temperature heat treatment. The mixed zinc-tin oxide forms an excellent barrier to the alkali ions migrating from the glass substrate at the high temperature of the heat treatment, especially the toughening treatment. It has and also conserves good adhesion to the glass substrate. It also has a good deposition rate when compared, for example, with $SiO_2$ or $Al_2O_3$, and it shows good durability when compared, for example, with pure ZnO or bismuth oxide. It may also be advantageous in that it has less of a tendency to generate haze after a heat treatment of the stack, when compared, for example, with Ti or Zr oxides. The layer consisting of an oxide, in direct contact with the substrate, advantageously has a thickness of at least 5 nm, preferably at least 8 nm and more preferentially at least 10 nm. These minimum thickness values make it possible, inter alia, to ensure the chemical durability of the product that has not been heat-treated, but also to ensure the resistance to the heat treatment.

Preferably, each dielectric coating comprises a layer of mixed zinc-tin oxide. The presence of this layer in each of the dielectric coatings promotes good resistance of the stack to the high-temperature heat treatment.

Preferably, the last dielectric layer of the last upper dielectric coating is a layer of silicon nitride or a layer of $SiO_2$. This layer promotes the chemical insulation, especially with respect to oxygen, of the stack relative to the external atmosphere, in particular during a high-temperature heat treatment. This promotes the conservation of the optical properties of the stack during the heat treatment. This does not, however, exclude the provision of a thin protective layer on this last silicon nitride or oxide layer, which virtually does not act as a dielectric layer with an interferential effect, but which fulfils another purpose, for example of mechanical protection, for instance a thin layer of mixed titanium-zirconium oxide.

A protective layer, or "barrier" layer, is preferably deposited directly onto the silver-based functional layer, or onto each of the functional layers if there are several of them. It may be a metallic layer, also generally known as a "sacrificial layer" in a manner known in the field, for example a thin layer of Ti, NiCr, Nb or Ta, deposited from a metal target in a neutral atmosphere and intended to preserve the silver during the deposition of the next dielectric layer, when this layer is made of oxide, and during the heat treatment. It may also be a TiOx layer deposited from a ceramic target in a virtually neutral atmosphere, or a layer of NiCrOx.

Preferably, the protective layer(s) deposited directly onto the silver-based functional layer(s) are made of ZnO, optionally doped with aluminum (ZnAlOx), obtained from a ceramic target, either doped with aluminum or sub-stoichiometric or made of pure ZnO also known as intrinsic-ZnO or iZnO, and deposited in a relatively neutral atmosphere, i.e. an atmosphere of pure argon or optionally with a maximum of 20% oxygen. Such a layer for protecting the functional layer(s) has the advantage of improving the light transmission of the stack and has a beneficial effect on the properties of the silver-based functional layer, especially as regards the emissivity and the mechanical strength. Such a layer for protecting the functional layer also has the advantage of attenuating the risk of modification of the total light transmission during the high-temperature heat treatment. A variation in the light transmission during the heat treatment of less than 6%, preferably less than 4% and advantageously less than 2% is thus more easily achieved.

Each silver-based functional layer is preferably deposited onto a wetting layer based on zinc oxide. The crystallographic growth of the functional layer on the wetting layer is thus favorable to obtaining low emissivity and good mechanical strength of the interfaces.

Preferably, the total light transmission TL of the transparent glazing bearing the multilayer stack deposited on a glass substrate made of ordinary clear sodio-calcic glass 4 mm thick is between 25% and 72%, preferably between 35% and 68%.

Needless to say, the glass substrate may be a bulk-tinted glass, such as a gray, blue or green glass, to absorb even more sunlight, or to form a private space with low light transmission so as to dissimulate the passenger compartment of the vehicle, or an office in a building, from external regard, or to provide a particular esthetic effect. The glass substrate may also be an extra-clear glass with very high light transmission. In this case, it will only absorb very little sun radiation.

The invention covers a laminated glazing comprising a transparent glazing according to the invention as described above, the multilayer stack of which may be in contact with the thermoplastic adhesive material connecting the substrates, generally PVB.

The invention also covers an insulating multiple glazing comprising a transparent glazing according to the invention as described above, for example a double or triple glazing with the multilayer stack arranged facing the closed space inside the multiple glazing.

Preferably, the solar factor g, measured according to standard EN410, is between 12% and 40%, advantageously between 20% and 36%, for a 6/15/4 double glazing made of clear glass. The double glazing is thus formed from a first sheet of ordinary sodio-calcic clear glass 6 mm thick bearing the multilayer stack in position 2, i.e. on the inner face of the double glazing, separated from another sheet of clear glass 4 mm thick, without a stack, by a closed space 15 mm thick filled with argon. Such a double glazing allows very effective solar control.

Preferably, in multiple glazing, the selectivity, expressed in the form of the light transmission TL relative to the solar factor g, is at least 1.4, advantageously at least 1.5, preferentially at least 1.6. A high selectivity value means that, despite an efficient solar factor which greatly reduces the amount of calorific energy coming from the sun and penetrating into the premises via the glazing, the light transmission remains as high as possible to enable lighting of the premises.

The invention also covers the use of the transparent solar-control glazing comprising on at least one of the faces of a glass substrate a transparent multilayer stack as described above, for obtaining a glazing equipped with the multilayer stack in which the variation of the substrate-side optical properties $\Delta E^*$ in transmission and in reflection following a toughening or bending heat treatment is less than 5, preferably less than 2.5 and advantageously less than 2.

5. DESCRIPTION OF PREFERRED EMBODIMENTS OF THE INVENTION

Examples of multilayer stacks deposited on a glass substrate to form glazings according to the invention, but also comparative examples ("C"), are given in tables 1 to 6 below. The properties are given in table 7 and are defined for a single glazing whose substrate is made of ordinary clear "float" glass 4 mm thick, unless otherwise indicated. The layers are in order, from left to right, starting from the glass. The approximate geometrical thicknesses are expressed in nm.

The solar radiation absorbing layers and the dielectric layers are applied via a cathodic sputtering technique under usual conditions for this type of technique. The metallic layers are deposited in a neutral atmosphere of argon. The nitrides are deposited in a reactive atmosphere of nitrogen and argon. The AZO layers are deposited, from a ceramic target of zinc oxide doped with 2% aluminum, under a neutral atmosphere of argon. The other oxides are deposited from a metallic target under a reactive atmosphere of oxygen and argon. As a variant, the dielectric layers are applied via the well-known technique known as PECVD (plasma-enhanced chemical vapor deposition).

The silicon nitride dielectric layers are produced from metal targets in an atmosphere consisting of a mixture of argon (30-70%) and nitrogen (70-30%) at a total pressure of 4 mTorr (0.53 Pa).

The chromium-zirconium layers (40% by weight of Cr and 60% of zirconium in the CrZr alloy), the nickel-chromium (80/20 nickel/chromium)-tungsten layers (50% by weight of NiCr and 50% of W in the NiCrW alloy) are deposited from metallic cathodes in an atmosphere of argon alone. As a variant, the deposition atmosphere of these CrZr and NiCrW metal alloys comprises a small amount of nitrogen originating from the neighboring deposition zones. As a result, the formed CrZr or NiCrW layer, while conserving its essentially metallic nature, contains a small amount of nitrogen. The properties obtained are similar.

In the tables, the notations SiN denote the silicon nitrides without representing a chemical formula, it being understood that the products obtained are not necessarily rigorously stoichiometric, but are those obtained under the indicated deposition conditions and which are in the region of the stoichiometric products. The SiN layers may contain up to a maximum of about 10% by weight of aluminum originating from the target.

In the tables, B represents a layer acting as a barrier to the oxidation of the silver, which is well known in the field; AZO represents a barrier layer based on zinc oxide, optionally doped with aluminum, deposited from a ceramic (cathode) target of zinc oxide (i-ZnO, known as intrinsic ZnO, or ZnO doped with aluminum) sputtered in an atmosphere based on argon with little or no oxygen; D represents one or more dielectric layers, especially based on zinc stannate, doped or undoped ZnO, or another material known in the field and which is suitable for this type of layer stacking, for example a nitride such as AlN. As a variant, AZO may be replaced with other barriers that are well known in the field and suited to the desired properties for the formed layer system, for instance a Ti oxide, which is undoped or doped with niobium or zirconium, preferably obtained from a ceramic target formed from the oxide to be deposited, or pure ZnO. The name "TZO" represents a mixed oxide comprising 50% $TiO_2$ and 50% $ZrO_2$. M represents the wetting layer based on ZnO, which is undoped or doped with aluminum. IR represents the functional layers that reflect infrared radiation. ABS represents the solar radiation absorbing layer. The name $ZSO_5$ represents a mixed zinc-tin oxide formed from a cathode of a zinc-tin alloy containing 52% by weight of zinc and 48% by weight of tin to form the spinel structure of zinc stannate $Zn_2SnO_4$. The name $TZO_{65}$ means a mixed titanium-zirconium oxide with 35% zirconium and 65% titanium, different from TZO (50/50).

Table 1 gives examples of glazings according to the invention in which the solar radiation absorbing layer of stacks with two silver-based functional layers is in the first dielectric coating. It is a metal as indicated in the table: NiCrW or CrZr.

As a variant of the examples given in table 1, a final protective TZO layer 3 nm thick covers the last layer of silicon nitride. The mechanical durability is thus reinforced.

Table 2 gives examples of glazings according to the invention in which the solar radiation absorbing layer of stacks with two silver-based functional layers is also in the first dielectric coating, but this time it is a nitride as indicated in the table: TiN or ZrN.

Table 3 gives an example of a glazing according to the invention in which the solar radiation absorbing layer (NiCrW) is also in the first dielectric coating, but this time it is a stack with three layers of silver. The substrate here is an ordinary sodio-calcic clear glass 6 mm thick.

Table 4 gives examples of glazings according to the invention in which the solar radiation absorbing layer of stacks with two silver-based functional layers is in the second dielectric coating. It is here a metal as indicated in the table: NiCrW or CrZr.

The examples in table 5 are similar to those in table 4, but for different nitrides as solar radiation absorbing layer, as indicated in the table.

Table 6 gives an example with three functional layers of silver, with the solar radiation absorbing layer (NiCrW) in the second dielectric coating. The substrate here is an ordinary sodio-calcic clear glass 6 mm thick.

Table 7 gives the various properties of the various examples.

The light transmission TL and light reflection are measured on the samples with the illuminant D65, 2°. The CIE colorimetric coordinates L*, a* and b* are also measured before and after heat treatment with the illuminant D65, 10°. The angle at which the measurements are taken is 8°. The solar factor value (g), measured according to standard EN410, is 37 for examples 11, 12 and 37.5 for example 53.

The samples are subjected to a heat treatment comprising maintaining at 670° C. for 7 minutes 30 seconds. The variations in transmission and in reflection in ΔE*, either in transmission $\Delta E^*_{Tt}$, or in reflection on the layer side ($\Delta E^*_{Rc}$), or in reflection on the glass substrate side ($\Delta E^*_{Rg}$), are also given in table 7. The values Y (which represent either the total light transmission or the total light reflection) are also indicated (in %) as transmission (TL), as reflection on the glass-substrate side (Rg) and as reflection on the layer-system side (Rc) after heat treatment. The variation in the total light transmission ($\Delta_{TL}$), and the variation in the total reflection on the glass-substrate side ($\Delta_{Rg}$) and on the layer-system side ($\Delta_{Rc}$) are also indicated in table 7. For examples 11, 12 and 53, the values Y and L*, a* and b* are indicated before heat treatment.

It is found that, for the comparative examples C1 and C2, which have no intercalating transparent oxide according to the invention, unacceptable colored marks appear following the high-temperature heat treatment. This prohibitive phenomenon does not appear with the glazings according to the invention.

The marks that appear following the heat treatment, and which are prohibitive for the marketing of a quality product, are zones with a diameter of about 5 to 10 mm which are visible to the naked eye at a distance of about 60 cm. These are marks with a different tint from the rest of the stack, which gives an unesthetic appearance that is unpleasant to the eye. When they are visible to the naked eye at a distance of 60 cm, the coated glazing is declassified and unacceptable for sale.

The specific electrical resistance of the stack is also higher for comparative example C2 relative to example 41 which has a similar structure but without the intercalating transparent oxide layer. For example C2, the specific electrical resistance Rs, expressed in ohms per square, is 1.74Ω/□ after heat treatment, whereas it is 1.55Ω/□ before heat treatment. For comparative purposes, the resistance Rs of example 41 before heat treatment is 1.51Ω/□ and it is reduced to 1.12Ω/□ after heat treatment. The specific electrical resistance Rs of example 11 before heat treatment is 1.13Ω/□; that of example 53 is 1.3 Ω/□.

Table 8 below gives the optical and thermal properties of a few examples installed in double glazing (6/15/4). This double glazing is formed from a first outer sheet of ordinary sodio-calcic clear glass 6 mm thick bearing the multilayer stack in position 2, i.e. on the inner face of the double glazing, separated from another sheet of clear glass 4 mm thick, without a stack, by a closed space 15 mm thick filled with argon. The multilayer stack did not undergo a heat treatment. Besides the optical properties, table 8 also gives the solar factor g, according to standard EN410, the energy absorption AE, the energy transmission TE, according to standard EN410, and the selectivity S expressed according to the ratio of the light transmission TL to the solar factor g.

Needless to say, the invention is not limited to the implementation examples mentioned in the present description.

TABLE 1

| | D1a | | D1b | | M | IR1 | B | D2 | | | M | IR2 | B | D3 |
|---|---|---|---|---|---|---|---|---|---|---|---|---|---|---|
| Ex. | SiN | ABS | SiN | ZSO5 | ZnO | Ag | AZO | ZSO5 | SiN | ZSO5 | ZnO | Ag | AZO | ZSO5 | SiN |
| | | NiCrW | | | | | | | | | | | | | |
| 1 | 10 | 0.8 | 10 | 9.4 | 5 | 12.4 | 2.5 | 20 | 35 | 20 | 5 | 14.6 | 2.5 | 14 | 20 |
| 2 | 10 | 1.4 | 10 | 4 | 5 | 14.5 | 2.5 | 20 | 35 | 20 | 5 | 14.6 | 2.5 | 14.4 | 20 |
| 3 | 10 | 2.7 | 10 | 4 | 5 | 14.5 | 2.5 | 20.8 | 35 | 15 | 5 | 14.9 | 2.5 | 14.3 | 20 |
| | | CrZr | | | | | | | | | | | | | |
| 4 | 10 | 1.4 | 10 | 4 | 5 | 14.5 | 2.5 | 20 | 35 | 20 | 5 | 14.6 | 2.5 | 14.4 | 20 |

TABLE 2

| | D1a | | D1b | | M | IR1 | B | D2 | | | M | IR2 | B | D3 |
|---|---|---|---|---|---|---|---|---|---|---|---|---|---|---|
| Ex. | SiN | ABS | SiN | ZSO5 | ZnO | Ag | AZO | ZSO5 | SiN | ZSO5 | ZnO | Ag | AZO | ZSO5 | SiN |
| | | TiN | | | | | | | | | | | | | |
| 5 | 10 | 7 | 10 | 3.5 | 4 | 12 | 5 | 24.6 | 35 | 19.8 | 5 | 13.8 | 5 | 7.5 | 28 |
| 6 | 10 | 9 | 10 | 3.5 | 4 | 14 | 5 | 25.3 | 35 | 20.5 | 5 | 13.8 | 5 | 7.5 | 28 |
| 7 | 10 | 12 | 10 | 3.5 | 4 | 14 | 5 | 21.8 | 35 | 18 | 5 | 13.8 | 5 | 7.5 | 28 |
| 8 | 10 | 7.7 | 10 | 2.5 | 3 | 15.4 | 5 | 24.3 | 35 | 19.5 | 5 | 16.1 | 5 | 7.3 | 28 |
| | | ZrN | | | | | | | | | | | | | |
| 9 | 10 | 11 | 10 | 3.5 | 4 | 14 | 5 | 25.3 | 35 | 20.5 | 5 | 13.8 | 5 | 7.5 | 28 |
| 10 | 10 | 14 | 10 | 3.5 | 4 | 14 | 5 | 21.8 | 35 | 18.0 | 5 | 13.8 | 5 | 7.5 | 28 |

TABLE 3

| | D1a | ABS | D1b | | M | IR1 | B | D2 | | | M | IR2 |
|---|---|---|---|---|---|---|---|---|---|---|---|---|
| Ex. | SiN | NiCrW | SiN | ZSO5 | ZnO | Ag | AZO | ZSO5 | SiN | ZSO5 | ZnO | Ag |
| 11 | 16.2 | 1.8 | 13.4 | 1.1 | 5 | 11.5 | 4 | 20 | 20 | 21.1 | 5 | 15.2 |
| 12 | 16.2 | 1.8 | 13.4 | 1.1 | 5 | 11.5 | 4 | 61.1 | 0 | 0 | 5 | 15.2 |

| | B | D3 | | | M | IR3 | B | D4 |
|---|---|---|---|---|---|---|---|---|
| Ex. | AZO | ZSO5 | SiN | ZSO5 | ZnO | Ag | AZO | ZSO5 | SiN |
| 11 | 4 | 15 | 17 | 29.1 | 5 | 16.2 | 4 | 14 | 18 |
| 12 | 4 | 32 | 0 | 29.1 | 5 | 16.2 | 4 | 14 | 18 |

TABLE 4

| Ex. | D1 | | M | IR1 | B | D2a | ABS | D2b | | M | IR2 | B | D3 | | P |
|---|---|---|---|---|---|---|---|---|---|---|---|---|---|---|---|
| | ZSO5 | ZnO | Ag | AZO | ZSO5 | SiN | NiCrW | SiN | ZSO5 | ZnO | Ag | AZO | ZSO5 | SiN | TZO |
| 13 | 38 | 4 | 14.1 | 5.5 | 24.1 | 20 | 1.1 | 25 | 11.5 | 4 | 15.5 | 5.5 | 9.8 | 21 | 3 |
| 14 | 38 | 4 | 14.1 | 5.5 | 29.6 | 20 | 1.1 | 25 | 6 | 4 | 15.5 | 5.5 | 9.8 | 21 | 3 |
| 15 | 38 | 4 | 14.1 | 5.5 | 32.6 | 20 | 1.1 | 25 | 3 | 4 | 15.5 | 5.5 | 9.8 | 21 | 3 |
| C1 | 38 | 4 | 14.1 | 5.5 | 35.6 | 20 | 1.1 | 25 | 0.0 | 4 | 15.5 | 5.5 | 9.8 | 21 | 3 |
| 16 | 45 | 4 | 17.2 | 5.5 | 24 | 20 | 1.71 | 25 | 11.4 | 4 | 17.1 | 5.5 | 9.9 | 24 | 0 |

TABLE 4-continued

| Ex. | D1 | M | IR1 | B | D2a | ABS | D2b | M | IR2 | B | D3 | P |
|---|---|---|---|---|---|---|---|---|---|---|---|---|
| 17 | 38 | 4 | 16.3 | 5.5 | 24.4 | 10 | 1.8 | 35 | 11.7 | 4 | 16.3 | 5.5 | 9.9 | 24 | 0 |
| 18 | 45 | 4 | 17.2 | 5.5 | 23.1 | 10 | 1.69 | 35 | 10.5 | 4 | 16.7 | 5.5 | 8.6 | 24 | 0 |

| | ZSO5 | ZnO | Ag | AZO | ZSO5 | SiN | NiCrW | SiN | TZO$_{65}$ | ZnO | Ag | AZO | ZSO5 | SiN | TZO$_{65}$ |
|---|---|---|---|---|---|---|---|---|---|---|---|---|---|---|---|
| 19 | 38 | 4.0 | 14.1 | 5.5 | 24.1 | 20 | 1.1 | 25 | 10 | 4 | 15.5 | 5.5 | 9.8 | 21 | 3 |

| | ZSO5 | ZnO | Ag | AZO | ZSO5 | SiN | NiCrW | SiN | ZSO5 | TZO$_{65}$ | ZnO | Ag | AZO | ZSO5 | SiN | TZO |
|---|---|---|---|---|---|---|---|---|---|---|---|---|---|---|---|---|
| 20 | 42 | 4 | 14.1 | 5.5 | 24.8 | 20 | 1.1 | 25 | 9.2 | 3 | 4 | 15.5 | 5.5 | 8.3 | 21 | 3 |

| | ZSO5 | ZnO | Ag | AZO | ZSO5 | SiN | CrZr | SiN | ZSO5 | ZnO | Ag | AZO | ZSO5 | SiN | |
|---|---|---|---|---|---|---|---|---|---|---|---|---|---|---|---|
| 21 | 39 | 4 | 14.1 | 5.5 | 23 | 20 | 0.75 | 25 | 11.5 | 4 | 15.5 | 5.5 | 10.2 | 24 | 0 |
| 22 | 39 | 4 | 14.1 | 5.5 | 22.8 | 20 | 0.9 | 25 | 10.5 | 4 | 15.5 | 5.5 | 10.2 | 24 | 0 |
| 23 | 39 | 4 | 14.1 | 5.5 | 22.4 | 35 | 0.9 | 10 | 10.5 | 4 | 15.6 | 5.5 | 10.4 | 24 | 0 |
| 24 | 39 | 4 | 16.6 | 5.5 | 22.7 | 20 | 1.3 | 25 | 10.7 | 4 | 16.5 | 5.5 | 10.3 | 24 | 0 |
| 25 | 38 | 4 | 10.5 | 5.5 | 20.4 | 20 | 0.6 | 25 | 8.7 | 4 | 16 | 5.5 | 9.5 | 24 | 0 |

TABLE 5

| | D1 | | M | IR1 | B | D2a | | | D2b | M | IR2 | B | D3 | |
|---|---|---|---|---|---|---|---|---|---|---|---|---|---|---|
| Ex. | ZSO5 | ZnO | | Ag | AZO | ZSO5 | SiN | ABS | SiN | ZSO5 | ZnO | | Ag | AZO | ZSO5 | SiN |

ZrN

| 26 | 36 | 4 | 16 | 5 | 14 | 20 | 11 | 20 | 15 | 4 | 15 | 5 | 13 | 24 |
|---|---|---|---|---|---|---|---|---|---|---|---|---|---|---|
| 27 | 36 | 4 | 16.9 | 7 | 10 | 20 | 18 | 20 | 10 | 4 | 14.5 | 7 | 11 | 24 |
| 28 | 36 | 4 | 16.9 | 6 | 13 | 20 | 15 | 20 | 13 | 4 | 14.8 | 6 | 8 | 24 |
| 29 | 36 | 4 | 16.7 | 5 | 10.5 | 10 | 14 | 30 | 10.5 | 4 | 14.7 | 5 | 9.3 | 24 |
| 30 | 36 | 4 | 15.2 | 5 | 13.3 | 20 | 8 | 20 | 13.3 | 4 | 14.1 | 5 | 9.9 | 24 |
| 31 | 37 | 4 | 13.1 | 5 | 15.8 | 20 | 4 | 20 | 15.8 | 4 | 13.9 | 5 | 10.3 | 24 |

TiN

| 32 | 36 | 4 | 16 | 5 | 20 | 20 | 8 | 20 | 19 | 4 | 16 | 5 | 13 | 24 |
|---|---|---|---|---|---|---|---|---|---|---|---|---|---|---|
| 33 | 36 | 4 | 16.2 | 6 | 16 | 20 | 9.5 | 20 | 17 | 4 | 14 | 6 | 10 | 24 |
| 34 | 36 | 4 | 16.5 | 7 | 16 | 20 | 9 | 20 | 16 | 4 | 15.2 | 7 | 8.5 | 24 |
| 35 | 34 | 4 | 16.2 | 6 | 16.9 | 30 | 9 | 10 | 16.9 | 4 | 15.1 | 6 | 8.5 | 24 |
| 36 | 34 | 4 | 14.8 | 6 | 17.5 | 20 | 6.5 | 20 | 17.5 | 4 | 14.4 | 6 | 9.2 | 24 |
| 37 | 34 | 4 | 11.7 | 6 | 16.8 | 20 | 4.5 | 20 | 16.8 | 4 | 15.1 | 6 | 10 | 24 |

TiZrN

| 38 | 34 | 4 | 16.2 | 6 | 16.9 | 20 | 12 | 20 | 16.9 | 4 | 15.1 | 6 | 8.5 | 24 |
|---|---|---|---|---|---|---|---|---|---|---|---|---|---|---|
| 39 | 34 | 4 | 16.2 | 6 | 16.9 | 20 | 7 | 20 | 16.9 | 4 | 15.1 | 6 | 9.5 | 24 |
| 40 | 34 | 4 | 16.2 | 6 | 16.9 | 20 | 5 | 20 | 16.9 | 4 | 15.1 | 6 | 9.5 | 24 |
| 41 | 34 | 4 | 16.2 | 6 | 16.9 | 20 | 7 | 30 | 6.9 | 4 | 15.1 | 6 | 9.5 | 24 |
| C2 | 34 | 4 | 16.2 | 6 | 16.9 | 20 | 7 | 36.9 | 0 | 4 | 15.1 | 6 | 9.5 | 24 |
| 42 | 34 | 4 | 16.2 | 6 | 26.9 | 20 | 7 | 10 | 16.9 | 4 | 15.1 | 6 | 9.5 | 24 |
| 43 | 34 | 4 | 16.2 | 6 | 26.9 | 20 | 7 | 20 | 6.9 | 4 | 15.1 | 6 | 9.5 | 24 |

NiVN

| 44 | 38 | 4 | 14.1 | 5.5 | 24.1 | 20 | 1.5 | 25 | 11.5 | 4 | 15.5 | 5.5 | 9.8 | 24 |
|---|---|---|---|---|---|---|---|---|---|---|---|---|---|---|

NiCrWN

| 45 | 38 | 4 | 14.1 | 5.5 | 24.1 | 20 | 1.3 | 25 | 11.5 | 4 | 15.5 | 5.5 | 9.8 | 24 |
|---|---|---|---|---|---|---|---|---|---|---|---|---|---|---|
| 46 | 38 | 4 | 14.1 | 5.5 | 24.1 | 20 | 1.5 | 25 | 11.5 | 4 | 15.5 | 5.5 | 9.8 | 24 |

TiAlN

| 47 | 38 | 4 | 14.1 | 5.5 | 24.1 | 20 | 15 | 25 | 11.5 | 4 | 15.5 | 5.5 | 9.8 | 24 |
|---|---|---|---|---|---|---|---|---|---|---|---|---|---|---|
| 48 | 38 | 4 | 14.1 | 5.5 | 24.1 | 20 | 11 | 25 | 11.5 | 4 | 15.5 | 5.5 | 9.8 | 24 |

SiZrN

| 49 | 38 | 4 | 14.1 | 5.5 | 24.1 | 20 | 25 | 25 | 11.5 | 4 | 15.5 | 5.5 | 9.8 | 24 |
|---|---|---|---|---|---|---|---|---|---|---|---|---|---|---|
| 50 | 38 | 4 | 14.1 | 5.5 | 24.1 | 20 | 20 | 25 | 11.5 | 4 | 15.5 | 5.5 | 9.8 | 24 |

SiNiCrN

| 51 | 38 | 4 | 14.1 | 5.5 | 24.1 | 20 | 24 | 25 | 11.5 | 4 | 15.5 | 5.5 | 9.8 | 24 |
|---|---|---|---|---|---|---|---|---|---|---|---|---|---|---|
| 52 | 38 | 4 | 14.1 | 5.5 | 24.1 | 20 | 18 | 25 | 11.5 | 4 | 15.5 | 5.5 | 9.8 | 24 |

TABLE 6

| Ex. | D1 ZSO5 | M ZnO | IR1 Ag | B AZO | D2a ZSO5 | D2a SiN | ABS NiCrW | D2b SiN | D2b ZSO5 | M ZnO | IR2 Ag | B AZO | D3 ZSO5 | D3 SiN | D3 ZSO5 | M ZnO | IR3 Ag | B AZO | D4 ZSO5 | D4 SiN |
|---|---|---|---|---|---|---|---|---|---|---|---|---|---|---|---|---|---|---|---|---|
| 53 | 17.7 | 5 | 9.2 | 4 | 19 | 20 | 0.8 | 15 | 10 | 5 | 15.1 | 4 | 20 | 20 | 25.8 | 5 | 15.5 | 4 | 14 | 18.9 |

TABLE 7

| Ex. | $\Delta_{TL}$ | $\Delta_{Rc}$ | $\Delta_{Rg}$ | $\Delta E^*_{TL}$ | $\Delta E^*_{Rc}$ | $\Delta E^*_{Rg}$ | TL Y | TL L* | TL a* | TL b* | Rg Y | Rg L* | Rg a* | Rg b* | RI Y | RI L* | RI a* | RI b* |
|---|---|---|---|---|---|---|---|---|---|---|---|---|---|---|---|---|---|---|
| 1 | −1.7 | 0.3 | 0.9 | 2.9 | 2 | 6.1 | 65.5 | 84.8 | −2.4 | −0.1 | 8.7 | 35.3 | −2.5 | −1.8 | 6.6 | 31.2 | −7 | −6.5 |
| 2 | −5.7 | −0.9 | 1.7 | 5.7 | 3.9 | 8.4 | 51.8 | 77.2 | −3.7 | −0.9 | 11.4 | 40.2 | −2.3 | 1.1 | 9 | 36.4 | −5.4 | −12 |
| 3 | −2.7 | −0.5 | 0.9 | 3.1 | 3.5 | 5.1 | 43.4 | 71.9 | −3.5 | −2.8 | 9.6 | 37.1 | −0.7 | 0.2 | 11.6 | 40.7 | 0.4 | −2.5 |
| 4 | −5.7 | −0.9 | 1.7 | 5.7 | 3.9 | 8.4 | 51.8 | 77.2 | −3.7 | −0.9 | 11.4 | 40.2 | −2.3 | 1.1 | 9 | 36.4 | −5.4 | −12 |
| 5 | 2.2 | 0.5 | 0.5 | 2.1 | 2.4 | 2.5 | 63.2 | 83.5 | −4.3 | 4.3 | 7.9 | 33.6 | −2.4 | 2.0 | 7.9 | 33.6 | −5.7 | −10.2 |
| 6 | 2.2 | 0.5 | 1.3 | 2.4 | 2.4 | 4.1 | 55.9 | 79.5 | −4.8 | 4.8 | 9.5 | 36.6 | −1.0 | 8.9 | 9.5 | 42.2 | −5.9 | −8.7 |
| 7 | 2.5 | −0.2 | 1.1 | 1.7 | 0.8 | 5.4 | 50.0 | 76.1 | −7.6 | 2.6 | 7.7 | 33.1 | 2.6 | 9.7 | 7.7 | 41.2 | 0.4 | −4.5 |
| 8 | 1.5 | 0.7 | 1.0 | 2.0 | 1.9 | 2.9 | 57.1 | 80.1 | −8.4 | 7.4 | 9.9 | 37.7 | −2.3 | −0.4 | 9.9 | 38.9 | 4.2 | −20.5 |
| 9 | 5.2 | −0.8 | 0.4 | 2.8 | 3.4 | 1.4 | 65.1 | 84.8 | −5.7 | 7.8 | 5.7 | 28.5 | −0.1 | −0.3 | 8.2 | 35.0 | −0.9 | −18.5 |
| 10 | 6.6 | −1.1 | 0.7 | 3.8 | 4.2 | 2.4 | 60.3 | 82.0 | −8.2 | 4.0 | 5.2 | 27.5 | 2.3 | −2.7 | 8.8 | 35.9 | 4.9 | −12.0 |
| 11 |  |  |  | 3 | 4 | 8 | 36.5 | 80 | −6 | −0.8 | 6.7 | 31.1 | −3.9 | −0.9 | 2.9 | 19.6 | 12.8 | −9 |
| 12 |  |  |  | 3 | 4 | 8 | 36.5 | 80 | −6 | −0.8 | 6.7 | 31.1 | −3.9 | −0.9 | 2.9 | 19.6 | 12.8 | −9 |
| 13 | 1.5 | 1.9 | 0.5 | 1.1 | 5.6 | 1.0 | 59.3 | 81.5 | −4.9 | 2.2 | 11.5 | 40.4 | 0.2 | −2.4 | 6.6 | 31.3 | 2.9 | −17.1 |
| 14 | 2.6 | 1.7 | 0.1 | 1.7 | 4.6 | 1.1 | 60.9 | 82.4 | −4.7 | 2.0 | 10.6 | 38.9 | 0.4 | −3.6 | 6.9 | 32.1 | 2.1 | −17.9 |
| 15 | 2.8 | 1.4 | −0.4 | 1.6 | 4.5 | 1.3 | 61.5 | 82.6 | −5.1 | 3.0 | 9.7 | 37.4 | 1.8 | −3.8 | 6.6 | 31.5 | 3.4 | −19.9 |
| C1 | 2.7 | 1.6 | −1.1 | 1.8 | 6.1 | 2.7 | 61.8 | 82.8 | −5.5 | 5.8 | 8.8 | 35.7 | 3.8 | −8.0 | 6.9 | 32.3 | 6.0 | −23.0 |
| 16 | 1.7 | 2.0 | −0.7 | 2.8 | 6.7 | 2.8 | 45.0 | 72.9 | −6.7 | 0.4 | 17.3 | 48.8 | 0.5 | −2.0 | 7.4 | 33.3 | 10.8 | −19.4 |
| 17 | 1.6 | 1.7 | −0.4 | 2.0 | 4.5 | 2.2 | 44.8 | 72.9 | −5.8 | −0.6 | 18.0 | 49.4 | −1.4 | 2.9 | 7.9 | 34.4 | 4.3 | −18.1 |
| 18 | 0.9 | 1.8 | −0.8 | 1.6 | 5.9 | 3.1 | 44.2 | 72.5 | −6.4 | −0.9 | 17.9 | 49.4 | 0.0 | −0.4 | 7.4 | 33.0 | 8.1 | −12.5 |
| 19 | −0.7 | 2.0 | −0.1 | 2.0 | 2.2 | 5.2 | 56.6 | 80.0 | −5.3 | 0.4 | 12.0 | 41.2 | 1.3 | −1.7 | 6.9 | 31.9 | 0.8 | −15.0 |
| 20 | 2.8 | 1.6 | −0.3 | 1.6 | 4.7 | 2.0 | 59.7 | 81.7 | −4.8 | 1.6 | 10.9 | 39.0 | −4.0 | −3.9 | 6.9 | 31.8 | 1.6 | −11.5 |
| 21 | 1.2 | 1.8 | 0.3 | 1.5 | 4.4 | 2.5 | 60.3 | 81.9 | −4.1 | 4.8 | 11.9 | 41.2 | −2.6 | −8.0 | 6.9 | 32.0 | −2.2 | −16.2 |
| 22 | 1.2 | 1.9 | 0.3 | 2.2 | 5.1 | 2.0 | 55.9 | 79.6 | −4.5 | 3.6 | 12.3 | 41.8 | −2.2 | −4.8 | 5.9 | 29.6 | 0.6 | −16.4 |
| 23 | 2.7 | 1.2 | −1.5 | 1.7 | 4.3 | 3.1 | 55.9 | 79.5 | −4.7 | 4.5 | 11.5 | 40.4 | −1.6 | −4.7 | 5.5 | 28.6 | 2.2 | −16.4 |
| 24 | 1.0 | 2.1 | −0.4 | 2.1 | 5.4 | 1.4 | 39.3 | 69.0 | −5.8 | 1.8 | 20.7 | 52.6 | −1.3 | 1.1 | 7.6 | 33.7 | 5.4 | −18.9 |
| 25 | 2.3 | 1.9 | 0.8 | 1.3 | 5.0 | 3.2 | 67.8 | 85.9 | −4.6 | 3.4 | 5.4 | 28.0 | 0.6 | −7.5 | 5.7 | 28.4 | 8.5 | −1.2 |
| 26 | 7.7 | 4.1 | −0.8 | 5.4 | 12.1 | 5.3 | 53.0 | 77.7 | −7.5 | 11.9 | 17.8 | 49.6 | 2.6 | −12.3 | 6.1 | 30.9 | 3.6 | −34.0 |
| 27 | 10.7 | 3.8 | −2.5 | 9.1 | 16.1 | 8.1 | 41.7 | 70.5 | −8.9 | 10.0 | 22.3 | 54.4 | 4.3 | −2.9 | 4.3 | 26.0 | 11.0 | −37.4 |
| 28 | 7.2 | 4.6 | −0.7 | 6.3 | 10.9 | 6.6 | 46.6 | 73.8 | −6.2 | 7.3 | 22.7 | 55.0 | −2.8 | −5.8 | 7.9 | 34.6 | −8.7 | −21.4 |
| 29 | 8.2 | 3.5 | −1.2 | 6.7 | 12.3 | 7.9 | 48.1 | 74.8 | −7.2 | 6.5 | 20.2 | 52.2 | −0.6 | −3.4 | 4.9 | 27.4 | −1.6 | −22.8 |
| 30 | 5.6 | 2.9 | −0.7 | 3.7 | 7.6 | 4.8 | 60.4 | 81.9 | −5.5 | 6.9 | 14.8 | 45.5 | −1.4 | −5.1 | 5.8 | 29.3 | −7.5 | −15.7 |
| 31 | 3.0 | 0.8 | −0.3 | 1.6 | 2.2 | 1.3 | 74.8 | 89.2 | −3.4 | 7.5 | 9.0 | 36.1 | −2.2 | −9.2 | 6.8 | 31.6 | −7.3 | −7.7 |
| 32 | 1.4 | −0.2 | −6.8 | 4.0 | 3.8 | 12.1 | 49.4 | 75.5 | −7.4 | 10.5 | 16.7 | 48.1 | 3.0 | −11.2 | 6.1 | 31.0 | 5.1 | −34.2 |
| 33 | 1.6 | 0.5 | −5.3 | 1.3 | 2.3 | 7.8 | 45.0 | 72.9 | −7.6 | 5.2 | 20.1 | 51.7 | 3.3 | 2.8 | 3.2 | 21.8 | 8.4 | −28.2 |
| 34 | 4.4 | 0.2 | −3.5 | 3.2 | 4.3 | 5.1 | 45.4 | 73.1 | −7.7 | 6.0 | 19.4 | 50.7 | 2.8 | −1.9 | 4.5 | 26.1 | 6.2 | −26.8 |
| 35 | 4.1 | 0.2 | −1.5 | 2.7 | 4.5 | 2.6 | 46.3 | 73.8 | −7.1 | 3.4 | 19.7 | 51.5 | 0.2 | −0.6 | 5.0 | 27.5 | 1.3 | −22.8 |
| 36 | 3.4 | 0.6 | −0.6 | 2.0 | 1.8 | 2.7 | 57.4 | 80.4 | −5.6 | 4.7 | 14.3 | 44.7 | −0.3 | −3.1 | 5.1 | 27.6 | −3.6 | −18.0 |
| 37 | 2.8 | 0.6 | 0.1 | 1.8 | 2.1 | 2.4 | 68.5 | 86.2 | −4.9 | 5.6 | 7.0 | 32.1 | 0.4 | −10.0 | 4.6 | 25.8 | 3.2 | −13.9 |
| 38 | 5.1 | 1.4 | −1.4 | 3.8 | 5.7 | 2.6 | 40.6 | 69.8 | −5.2 | 6.2 | 24.2 | 56.4 | −3.8 | −0.8 | 8.9 | 36.3 | −3.7 | −17.8 |
| 39 | 5.8 | 0.5 | −3.1 | 3.7 | 2.0 | 4.5 | 49.4 | 75.6 | −5.0 | 8.1 | 18.9 | 50.6 | −2.6 | −2.5 | 6.7 | 31.7 | −4.9 | −19.7 |
| 40 | −1.8 | 1.4 | 1.0 | 3.4 | 3.5 | 6.2 | 57.8 | 80.5 | −4.4 | 8.0 | 15.7 | 46.6 | −2.2 | −4.4 | 6.5 | 31.1 | −7.1 | −16.9 |
| 41 | 5.3 | 1.0 | −1.6 | 3.3 | 3.4 | 2.7 | 49.3 | 75.5 | −5.0 | 7.4 | 19.4 | 51.2 | −2.7 | −2.9 | 6.7 | 31.8 | −4.5 | −21.6 |
| C2 | −1.2 | 5.3 | 1.4 | 1.8 | 11.7 | 3.7 | 49.3 | 75.5 | −5.2 | 7.7 | 19.2 | 50.9 | −2.3 | −2.6 | 6.6 | 31.5 | −4.3 | −21.7 |
| 42 | 4.8 | 1.0 | −1.5 | 3.0 | 2.2 | 2.2 | 49.9 | 75.9 | −5.1 | 6.1 | 19.0 | 50.6 | −2.2 | 0.0 | 8.5 | 35.7 | −7.4 | −21.5 |
| 43 | 6.4 | 0.1 | −3.9 | 4.2 | 0.9 | 5.8 | 50.0 | 76.0 | −5.1 | 6.8 | 17.9 | 49.3 | −2.1 | 0.9 | 8.1 | 35.0 | −6.7 | −21.2 |
| 44 | 4.8 | 1.8 | −1.8 | 3.5 | 4.5 | 5.0 | 48.3 | 75.2 | −6.7 | −2.3 | 12.7 | 42.2 | 2.1 | 5.3 | 7.5 | 33.1 | 10.1 | −8.5 |
| 45 | 3.8 | 2.1 | −0.7 | 2.2 | 6.3 | 4.3 | 60.9 | 82.3 | −4.1 | 3.2 | 10.2 | 38.3 | −5.2 | −3.3 | 7.2 | 32.7 | −1.6 | −10.7 |
| 46 | 4.0 | 1.9 | −1.1 | 2.4 | 5.4 | 3.7 | 56.8 | 80.1 | −4.5 | 2.3 | 11.1 | 39.7 | −5.0 | −0.1 | 7.4 | 33.0 | −0.3 | −8.6 |
| 47 | −4.1 | 1.9 | −2.1 | 3.0 | 6.5 | 2.9 | 38.4 | 68.2 | −5.6 | 9.3 | 22.7 | 54.9 | −6.8 | −2.1 | 22.4 | 54.4 | 2.2 | −1.5 |
| 48 | −0.1 | 3.0 | −0.4 | 1.7 | 5.3 | 4.5 | 50.6 | 76.2 | −2.6 | 9.9 | 19.5 | 51.4 | −9.3 | −1.6 | 19.4 | 51.2 | −5.0 | −4.3 |
| 49 | 3.0 | 1.5 | −0.1 | 2.9 | 2.9 | 3.4 | 47.1 | 74.4 | −5.1 | −0.1 | 40.4 | 69.4 | 1.1 | 13.7 | 41.4 | 70.0 | 4.0 | 14.3 |
| 50 | 2.1 | 2.2 | 0.5 | 4.1 | 4.0 | 3.3 | 55.2 | 79.2 | −1.5 | 3.7 | 34.1 | 64.9 | −2.8 | 3.2 | 35.5 | 65.9 | −1.7 | 6.4 |
| 51 | 1.4 | −0.1 | −0.5 | 1.5 | 1.4 | 1.9 | 43.5 | 72.2 | −8.5 | −6.9 | 34.4 | 64.5 | 7.0 | 28.3 | 32.6 | 62.9 | 12.6 | 31.8 |
| 52 | 1.6 | −1.8 | −3.2 | 1.9 | 3.3 | 3.2 | 45.8 | 73.6 | −5.9 | −2.1 | 32.6 | 63.4 | 3.4 | 15.4 | 32.3 | 62.9 | 8.7 | 21.1 |
| 53 |  |  |  | 1.5 | 7.1 | 3.5 | 57 | 80.3 | −5.9 | −1.5 | 5.1 | 27.1 | 1.6 | −5.8 | 4.1 | 24.8 | 5.4 | −13.5 |

TABLE 8

| | TL | | | | Rg (external) | | | | Rc (internal) | | | | Double glazing (6/15/4) | | | |
|---|---|---|---|---|---|---|---|---|---|---|---|---|---|---|---|---|
| | | | | | | | | | | | | | TE | | g | |
| Ex. | Y | L* | a* | b* | Y | L* | a* | b* | Y | L* | a* | b* | EN410 | AE | EN410 | S |
| 11 | 51.4 | 77 | −5.6 | −0.9 | 8.1 | 34.4 | −0.7 | −7.0 | 10.2 | 38.2 | 0.7 | −0.8 | 23 | 48 | 26.5 | 1.94 |
| 13 | 50.8 | 76.6 | −6.0 | 3.0 | 14.0 | 44.3 | −2.2 | −4.0 | 12.3 | 41.9 | 0.6 | −10.4 | 25.8 | 40.7 | 28.6 | 1.78 |
| 16 | 39.3 | 69.1 | −7.3 | 1.4 | 18.9 | 50.7 | −1.5 | −4.2 | 13.8 | 44.3 | 3.6 | −12.7 | 19.1 | 42.7 | 21.6 | 1.82 |
| 17 | 38.2 | 68.3 | −7.1 | 0.5 | 20.1 | 51.9 | −1.2 | 0.8 | 13.2 | 43.4 | 2.5 | −13.1 | 18.9 | 43.8 | 21.5 | 1.78 |
| 25 | 60.4 | 82.0 | −5.6 | 3.0 | 9.2 | 36.4 | −1.9 | −4.8 | 12.8 | 42.5 | 3.7 | −1.0 | 31.4 | 38.9 | 34.4 | 1.76 |
| 23 | 49.8 | 76.0 | −5.5 | 3.1 | 14.8 | 45.5 | −3.3 | −3.9 | 12.9 | 42.9 | −0.5 | −9.8 | 25.6 | 40.7 | 28.4 | 1.76 |
| 24 | 35.2 | 66.0 | −6.6 | 1.4 | 21.9 | 53.9 | −2.1 | 0.7 | 14.3 | 45.0 | 2.3 | −12.6 | 17.6 | 45.1 | 20.3 | 1.74 |
| 53 | 51.6 | 77.2 | −6.3 | −1.3 | 7.7 | 33.5 | −0.8 | −5.1 | 11.4 | 40.5 | 1.7 | −6.7 | 0.2 | 40 | 27.1 | 1.9 |

The invention claimed is:

1. A heat treatable transparent solar-control glazing, comprising:
a glass substrate and a transparent multilayer stack on at least one face of the glass substrate, the transparent multilayer stack comprising an alternation of n silver-based functional layers that reflect infrared radiation and of n+1 dielectric coatings, with n≥1, such that each functional layer is surrounded by dielectric coatings, one of the dielectric coatings comprising:
an essentially metallic solar radiation-absorbing layer, the solar radiation absorbing layer being a metal selected from the group consisting of NiCrW, WTa, WCr, NbZr, TaNiV, NbCr, CrZr, and NiV,
two dielectric layers, each of the two dielectric layers being formed from a material selected from the group consisting of silicon nitride, aluminum nitride and a mixture thereof,
an intercalating transparent oxide layer based on an oxide selected from the group consisting of a zinc oxide, a tin oxide, a zirconium oxide, a titanium oxide, a mixture thereof and an alloy thereof, and
a wetting layer based on zinc oxide;
wherein:
the at least one solar radiation-absorbing layer is enclosed between the two dielectric layers;
at least one of the functional layers is placed on the at least one solar radiation-absorbing layer such that the intercalating transparent oxide layer and the wetting layer are placed between the at least one solar radiation-absorbing layer and the functional layer and the wetting layer is in immediate proximity to the functional layer;
the intercalating transparent oxide layer is of a different composition from the wetting layer;
a dielectric layer deposited on the glass substrate and in contact therewith is an oxide layer;
the transparent multilayer stack has only one solar radiation-absorbing layer; and
the transparent solar control glazing has a variation of the substrate-side optical properties, ΔE*, in transmission and in reflection following a toughening or bending heat treatment of less than 5.

2. The transparent solar-control glazing according to claim 1, wherein the intercalating transparent oxide layer is based on an oxide selected from the group consisting of a mixed zinc tin oxide and a mixed titanium zirconium oxide.

3. The transparent solar-control glazing according to claim 1, wherein the intercalating transparent oxide layer has a geometrical thickness of between 3 and 25 nm.

4. The transparent solar-control glazing according to claim 1, wherein the two dielectric layers enclosing the solar radiation-absorbing layer are based on silicon nitride.

5. The transparent solar-control glazing according to claim 1, wherein the transparent multilayer stack comprises at least two silver-based functional layers that reflect infrared radiation.

6. The transparent solar-control glazing according to claim 5, wherein the solar radiation-absorbing layer is placed between the two silver-based functional layers.

7. The transparent solar-control glazing according to claim 1, wherein the glass substrate coated with the multilayer stack has an energy absorption, AE, according to standard EN410, of less than 50.

8. The transparent solar-control glazing according to claim 1, wherein the dielectric layer deposited on the glass substrate and in contact therewith is a layer of mixed zinc-tin oxide.

9. The transparent solar-control glazing according to claim 1, further comprising one or more protective layers deposited directly on the silver-based functional layer(s), wherein the one or more protective layers are made of ZnO and are optionally doped with aluminium obtained from a ceramic target.

10. The transparent solar-control glazing according to claim 1, having a total light transmission, TL, of between 25% and 72%.

11. A laminated glazing comprising the transparent solar-control glazing according to claim 1.

12. The transparent solar-control glazing according to claim 1, having a variation of the substrate-side optical properties, ΔE*, in transmission and in reflection following a toughening or bending heat treatment of less than 2.5.

13. An insulating multiple glazing comprising the transparent solar-control glazing according to claim 1.

14. The insulating multiple glazing according to claim 13, having a solar factor, g, measured according to standard EN410, of between 12% and 40%, for a 6/15/4 double glazing made of clear glass.

15. The insulating multiple glazing according to claim 14, having a selectivity, expressed in the form of the light transmission, TL, relative to the solar factor g, of at least 1.4.

16. A heat treatable transparent solar-control glazing, comprising:
a glass substrate and a transparent multilayer stack on at least one face of the glass substrate, the transparent multilayer stack comprising an alternation of n silver-based functional layers that reflect infrared radiation and of n+1 dielectric coatings, with n≥1, such that each functional layer is surrounded by dielectric coatings, and one of the dielectric coatings has the following five layer sequence:
a first dielectric layer formed from a material selected from the group consisting of silicon nitride, aluminum nitride and a mixture thereof;

a solar radiation-absorbing layer;
a second dielectric layer formed from a material selected from the group consisting of silicon nitride, aluminum nitride and a mixture thereof,
an intercalating transparent oxide layer selected from the group consisting of a tin oxide, a zirconium oxide, a titanium oxide, a mixture thereof and an alloy thereof, and
a wetting layer comprising zinc oxide;
wherein:
the five layer sequence is located between two functional layers,
the transparent multilayer stack has only one solar radiation-absorbing layer; and
the transparent solar control glazing has a variation of the substrate-side optical properties, $\Delta E^*$, in transmission and in reflection following a toughening or bending heat treatment of less than 5.

17. The transparent solar-control glazing according to claim 16, wherein the solar radiation-absorbing layer is essentially in metallic form.

18. The transparent solar-control glazing according to claim 16, wherein the solar radiation-absorbing layer is an alloy selected from the group consisting of NiCr, NiCrW, WTa, WCr, NbZr, TaNiV, NbCr, NW and CrZr.

19. The transparent solar-control glazing according to claim 16, wherein the solar radiation-absorbing layer is a nitride or a subnitride.

20. The transparent solar-control glazing according to claim 19, wherein the solar radiation-absorbing layer is a nitride selected from the group consisting of TiN, NiCrWN, NiVN, TaN, CrN, ZrN, CrZrN, TiAlN, TiZrN, WN, SiZrN and SiNiCrN.

21. A heat treatable transparent solar-control coated glass sheet, comprising the following layers in sequence starting from the glass sheet:
a mixed zinc-tin oxide layer;
a zinc oxide layer;
a layer comprising Ag;
a zinc oxide barrier layer;
a mixed zinc-tin oxide layer;
a silicon nitride layer;
a solar radiation-absorbing layer;
a silicon nitride layer;
an intercalating transparent oxide layer selected from the group consisting of a tin oxide, a zirconium oxide, a titanium oxide, a mixture thereof and an alloy thereof;
a wetting layer;
a layer comprising Ag;
a zinc oxide barrier layer; and
a dielectric coating,
wherein the transparent solar control glazing has a variation of the substrate-side optical properties, $\Delta E^*$, in transmission and in reflection following a toughening or bending heat treatment of less than 5.

\* \* \* \* \*